United States Patent
Roh et al.

(10) Patent No.: US 7,440,585 B2
(45) Date of Patent: Oct. 21, 2008

(54) AUTONOMOUS VEHICLE AND MOTION CONTROL THEREFOR

(75) Inventors: Kyoung-sig Roh, Kyungki-do (KR); Young Son, Kyungki-do (KR); Joo-young Kwak, Kyungki-do (KR)

(73) Assignee: Samsung Electronics Co., Ltd., Suwon, Kyungki-Do (KR)

( * ) Notice: Subject to any disclaimer, the term of this patent is extended or adjusted under 35 U.S.C. 154(b) by 775 days.

(21) Appl. No.: 10/427,973

(22) Filed: May 2, 2003

(65) Prior Publication Data

US 2004/0101161 A1 May 27, 2004

(30) Foreign Application Priority Data

Nov. 21, 2002 (KR) .................. 10-2002-0072696

(51) Int. Cl.
G06K 9/00 (2006.01)

(52) U.S. Cl. .............. 382/103; 382/128; 382/154; 382/284; 382/305; 359/619; 359/618; 356/139.04; 356/4.01; 356/139.07; 348/43

(58) Field of Classification Search .......... 359/619, 359/618; 382/103, 104, 181, 154, 128, 284, 382/305; 356/139.04, 4.01, 139.07; 348/43
See application file for complete search history.

(56) References Cited

U.S. PATENT DOCUMENTS

| 5,644,651 | A | | 7/1997 | Cox et al. |
|---|---|---|---|---|
| 6,038,074 | A | * | 3/2000 | Kitaguchi et al. ........... 359/618 |
| 6,122,078 | A | * | 9/2000 | Leberl et al. ................ 358/474 |
| 6,175,648 | B1 | | 1/2001 | Ayache et al. |
| 6,201,883 | B1 | * | 3/2001 | Mizui ......................... 382/109 |
| 6,393,144 | B2 | * | 5/2002 | Rogina et al. ................ 382/154 |
| 6,412,961 | B1 | * | 7/2002 | Hicks ......................... 359/846 |
| 6,430,304 | B2 | * | 8/2002 | Hanna et al. ................. 382/107 |
| 6,700,604 | B1 | * | 3/2004 | Murata et al. .......... 348/207.99 |
| 6,730,926 | B2 | * | 5/2004 | Boillot et al. .......... 250/559.23 |
| 7,003,136 | B1 | * | 2/2006 | Harville ...................... 382/103 |
| 2004/0005092 | A1 | * | 1/2004 | Tomasi ....................... 382/154 |

FOREIGN PATENT DOCUMENTS

JP 11-306363 11/1999

OTHER PUBLICATIONS

Estimation of Omnidirectional camera Model from epipolar geometry, Micusik et al,2004.*

(Continued)

*Primary Examiner*—Andrew W. Johns
*Assistant Examiner*—Nancy Bitar
(74) *Attorney, Agent, or Firm*—Buchanan Ingersoll & Rooney PC (57) ABSTRACT

There are provided an autonomous vehicle, and an apparatus and method for estimating the motion of the autonomous vehicle and detecting three-dimensional (3D) information of an object appearing in front of the moving autonomous vehicle. The autonomous vehicle measures its orientation using an acceleration sensor and a magnetic flux sensor, and extracts epipolar geometry information using the measured orientation information. Since the corresponding points between images required for extracting the epipolar geometry information can be reduced to two, it is possible to more easily and correctly obtain motion information of the autonomous vehicle and 3D information of an object in front of the autonomous vehicle.

49 Claims, 5 Drawing Sheets

OTHER PUBLICATIONS

The Epipolar geometry disclosed in a book entitled "Image processing analysis and machine vision"( Sonka V Hlavac and R Boyle, PWS Publishing, 1999,pp. 448-465.*

Derrouich, Salah, "A Combination of Monocular CCD Camera and Inertial-sensor For Range Estimation," IECON-2002, Proceedings of the 28th Annual Conference of the IEEE Industrial Electronics Society, Nov. 2002, pp. 2191-2196, vol. 1, New York, NY.

Lobo, Jorge et al., "Segmentation of Dense Depth Maps using Inertial Data A real-time implementation," Proceedings of the 2002 IEEE/RSJ International Conference on Intelligent Robots and Systems, Sep. 2002, pp. 92-97, vol. 1, New York, NY.

Mukai, Toshiharu et al., "The Recovery of Object Shape and Camera Motion Using a Sensing System with a Video Camera and A Gyro Sensor," Computer Vision 1999, Proceedings of the 7th IEEE International Conference on Kerkyra, Greece, Sep. 1999, pp. 411-417, vol. 1, Los Alamitos, CA.

Okatani, Takayuki et al., "Robust Estimation of Camera Translation Between Two Images Using a Camera With a 3D Orientation Sensor," Pattern Recognition 2002, Proceedings 16th International Conference on Quebec City, Que., Canada, Aug. 2002, pp. 275-278, vol. 1, Los Alamitos, CA.

* cited by examiner

AUTONOMOUS VEHICLE AND MOTION CONTROL THEREFOR

BACKGROUND OF THE INVENTION

This application claims the priority of Korean Patent Application No. 2002-72696, filed on Nov. 21, 2002, in the Korean Intellectual Property Office, the disclosure of which is incorporated herein in its entirety by reference.

1. Field of the Invention

The present invention relates to detecting and tracking of an object using an image processing system embedded in an automation system or an intelligent vehicle system. Particularly, the present invention relates to an autonomous vehicle, and more specifically, to an apparatus and method for estimating the motion of an autonomous vehicle like a mobile robot and detecting three-dimensional (3D) information of an object appearing in front of the moving autonomous vehicle.

2. Description of the Related Art

These days, as interests in robots increase constantly, various kinds of robots are being proposed and actively developed. While the robots are manufactured for many applications, motion control is a requisite for any robotic application. Particularly, in order to accurately control the motion of an autonomous vehicle like a mobile robot, not only information on the motion of the autonomous vehicle itself is required for accurate path planning and positioning of the autonomous vehicle, but also three-dimensional (3D) information of an object, e.g., an obstacle, in regard of a distance between the autonomous vehicle and the object, a 3D shape of the object, etc., is required for enabling the autonomous vehicle to avoid the obstacle appearing ahead.

There have been proposed a variety of methods for estimating the motion of an autonomous vehicle and obtaining 3D information on an object appearing in front of the moving autonomous vehicle. Usually, this 3D information is extracted from a two-dimensional (2D) image obtained through a camera. However, the methods that extract 3D information from a 2D image basically have restrictions in obtaining correct epipolar geometry information.

To solve the above-described problem, U. S. Pat. No. 6,430,304 to Hanna et al., issued on Aug. 6, 2002, and entitled "Method and Apparatus for Processing Images to Compute Image Flow Information," U. S. Pat. Nos. 6.421,961, 6,412, 961 to Hicks, issued on Jul. 2, 2002, and entitled "Rectifying Mirror," U. S. Pat. No. 6,393,144 to Rogina el al., issued on May 21, 2002, and entitled "Image Transformation and Synthesis Methods," or the like, teach methods for more accurately computing epipolar geometry information by removing noise. However, despite that more accurate epipolar geometry information can be obtained, still many assumptions and restrictions should be considered in computing the motion of an autonomous vehicle like a mobile robot, and therefore, there are still many restrictions when applying these conventional methods.

SUMMARY OF THE INVENTION

The present invention provides an apparatus and method for more accurately and simply obtaining motion information of an autonomous vehicle itself as well as three-dimensional information of an object existing in a moving path of the autonomous vehicle.

According to an aspect of the present invention, there is provided an autonomous vehicle including a corresponding point detection unit for obtaining information on corresponding points between images from at least two images obtained through a camera; an orientation measuring unit for computing orientation information of the autonomous vehicle; an epipolar computation unit for computing epipolar geometry information based on the orientation information and the information on corresponding points; a motion analysis unit for analyzing the motion of the autonomous vehicle based on the computed epipolar geometry information; and a three-dimensional (3D) information analysis unit for analyzing 3D information of an object existing in front of the autonomous vehicle based on the computed epipolar geometry information.

According to another aspect of the present invention, there is provided an apparatus for estimating the motion of an autonomous vehicle, which includes a corresponding point detection unit for obtaining information on corresponding points between images from at least two images obtained through a camera; an orientation measuring unit for computing orientation information of the autonomous vehicle; an epipolar computation unit for computing epipolar geometry information based on the orientation information and the information on corresponding points; and a motion analysis unit for analyzing motion of the autonomous vehicle based on the computed epipolar geometry information.

According to another aspect of the present invention, there is provided an apparatus for detecting three-dimensional (3D) information of an object existing in front of an autonomous vehicle, which includes a corresponding point detection unit for obtaining information on corresponding points between images from at least two images obtained through a camera; an orientation measuring unit for computing orientation information of the autonomous vehicle; an epipolar computation unit for computing epipolar geometry information based on the orientation information and the information on corresponding points; and a 3D information analysis unit for analyzing 3D information of the object existing in front of the autonomous vehicle based on the computed epipolar geometry information.

According to another aspect of the present invention, there is provided a method for controlling the motion of an autonomous vehicle, which includes the steps of (a) obtaining information on corresponding points between images from at least two images obtained through a camera; (b) computing orientation information of the autonomous vehicle; (c) computing epipolar geometry information based on the orientation information and the information on corresponding points; (d) analyzing the motion of the autonomous vehicle based on the computed epipolar geometry information; and (e) analyzing three-dimensional information of an object existing in front of the autonomous vehicle based on the computed epipolar geometry information.

According to another aspect of the present invention, there is provided a method for estimating the motion of an autonomous vehicle, which includes the steps of (a) obtaining information on corresponding points between images from at least two images obtained through a camera; (b) computing orientation information of the autonomous vehicle; (c) computing epipolar geometry information based on the orientation information and the information on corresponding points; and (d) analyzing the motion of the autonomous vehicle based on the computed epipolar geometry information.

According to another aspect of the present invention, there is provided a method for detecting three-dimensional (3D) information of an object existing in front of an autonomous vehicle, which includes the steps of (a) obtaining information on corresponding points between images from at least two images obtained through a camera; (b) computing orientation information of the autonomous vehicle; (c) computing epipolar geometry information based on the orientation information and the information on corresponding points; and (d) analyzing 3D information of the object existing in front of the autonomous vehicle based on the computed epipolar geometry information.

BRIEF DESCRIPTION OF THE DRAWINGS

The above aspects and advantages of the present invention will become more apparent by describing preferred embodiments thereof with reference to the attached drawings in which:

FIGS. 7a to 7c are photographic diagrams showing corresponding points and epipolar geometry information obtained by a system for detecting three-dimensional information of an object existing in front of an autonomous vehicle according to the present invention.

DETAILED DESCRIPTION OF THE INVENTION

Figure 1:
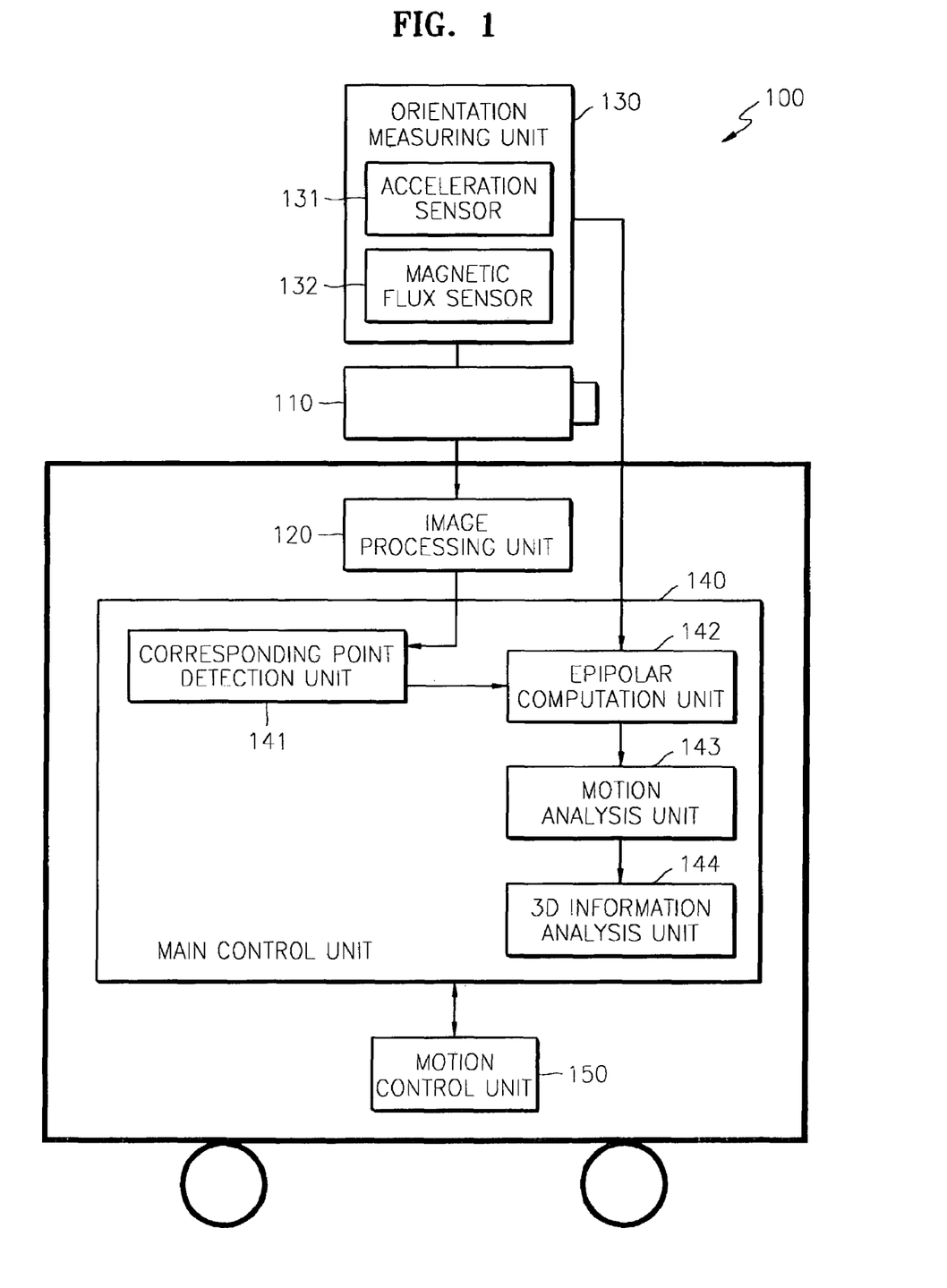
FIG. 1 is a block diagram of an autonomous vehicle incorporating a system for estimating the motion of the autonomous vehicle and detecting three-dimensional information of an object in front of the autonomous vehicle according to a preferred embodiment of the present invention.

FIG. 1 is a block diagram of an autonomous vehicle 100 incorporating a system for estimating the motion of the autonomous vehicle and detecting three-dimensional information of an object in front of the autonomous vehicle according to a preferred embodiment of the present invention. Referring to FIG. 1, the autonomous vehicle 100 includes a camera 110, an image processing unit 120, an orientation measuring unit 130, main control unit 140, and a motion control unit 150.

The camera 110 is attached on the autonomous vehicle 100 and continuously obtains images in front of the autonomous vehicle 100 with a predetermined frame rate. Although not shown in FIG. 1, it is assumed that the camera 110 and the autonomous vehicle 100 have the same coordinates.

The image processing unit 120 is connected to the camera 110 and serves as a frame grabber for capturing input images in a predetermined picture format. The images processed through the image processing unit 120 are provided to the main control unit 140 for analyzing the motion of the autonomous vehicle 100 and three-dimensional (3D) information of an object in front of autonomous vehicle 100. While a single camera 110 is shown in FIG. 1 so that the autonomous vehicle 100 can be embodied in a simple structure with low costs, it is understood that a stereo camera for obtaining two images at the same time or at least two cameras can be used.

The orientation measuring unit 130 measures the orientation of the autonomous vehicle 100. For this purpose, the orientation measuring unit includes an acceleration sensor 131, for sensing the acceleration of the autonomous vehicle 100, and a magnetic flux sensor 132. Here, the acceleration sensor 131 is also used for measuring gravity, while the magnetic flux sensor 132 is used for measuring terrestrial magnetism. The orientation measuring unit 130 computes orientation information of the autonomous vehicle 100 with respect to the fixed terrestrial coordinates using the absolute values of the values obtained through the acceleration sensor 131 and the magnetic flux sensor 132.

The main control unit 140 controls the overall operations of the autonomous vehicle 100. That is, the main control unit 140 analyzes the motion of the autonomous vehicle 100 and 3D information of an object in front of the autonomous vehicle 100 to efficiently control the autonomous vehicle 100. For this purpose, the main control unit 140 includes a corresponding point detection unit 141, an epipolar computation unit 142, a motion analysis unit 143, and a 3D information analysis unit 144.

The corresponding point detection unit 141 detects corresponding points placed in the environment from two consecutive images obtained through the camera 110 at a predetermined frame rate. The epipolar computation unit 142 computes epipolar geometry information based on orientation information R of the autonomous vehicle 100 provided from the orientation measuring unit 130 and the corresponding point information provided from the corresponding point detection unit 141. Based on the epipolar geometry information computed by the epipolar computation unit 142, the motion analysis unit 143 analyzes the motion of the autonomous vehicle 100. Further, based on the epipolar geometry information computed by the epipolar computation unit 142, the 3D information analysis unit 144 analyzes 3D information of an object appearing in front of the moving autonomous vehicle 100, e.g., information on a distance between the autonomous vehicle 100 and the object, information on a 3D shape of the object, etc. The motion control unit 150 controls the motion of the autonomous vehicle 100 in response to a control instruction from the main control unit 140.

Figure 2:
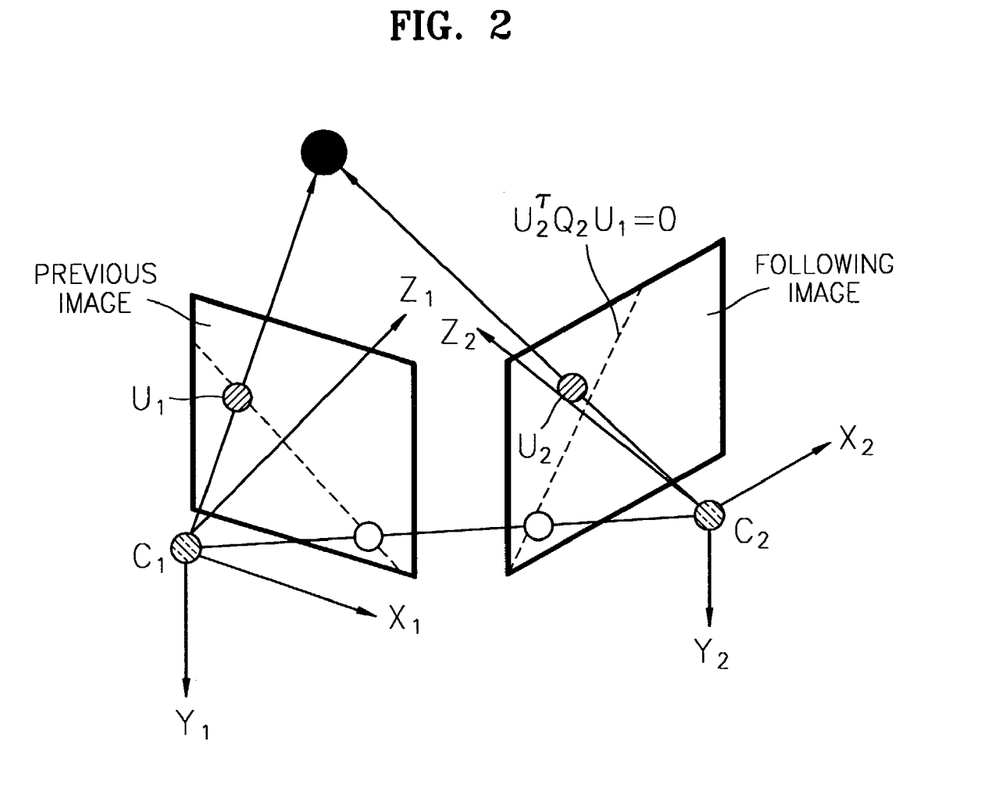
FIG. 2 illustrates epipolar geometries of two images consecutively obtained through the camera shown in FIG. 1.

FIG. 2 illustrates epipolar geometries of two images consecutively obtained through the camera 110 shown in FIG. 1. That is, referring to FIG. 2, there are shown two images consecutively obtained through the camera 110 shown in FIG. 1 at a predetermined frame rate. It is understood that unless the autonomous vehicle 100 stops moving, the two images are obtained through the camera 110 at two different locations.

Referring again to FIG. 2, coordinate systems centered at the middle of the lens of the camera 110 placed at the two different locations are defined as follows:

$$C_1=(X_1, Y_1, Z_1) \text{ and } C_2=(X_2, Y_2, Z_2) \tag{1}$$

In relation to the coordinate systems defined above, the projected image planes are defined as follows:

$$U_1=(u_1, v_1, f) \text{ and } U_2=(u_2, v_2, f) \tag{2}$$

where $U_1$ is an image point projected on a previous image, $U_2$ is an image point projected on a following image, u and v are x and y coordinates on the corresponding image planes, and f is a focal length of the camera.

The relationship between the camera 100 at one location and that at the other location is defined as follows:

$$X_2=R_{12}(X_1-T_1) \tag{3}$$

where $R_{12}$ represents orientation information between two images, and $T_1$ represents translation information with respect to the previous image.

The relationship between the coordinate system of the camera 110 and that of the images with respect to an arbitrary point j can be represented as follows:

$$U_{1j} = \frac{f}{Z_{1j}} X_{1j} \text{ and } U_{2j} = \frac{f}{Z_{2j}} X_{2j} \qquad (4)$$

To simplify the Equation (4), an arbitrary matrix Q is defined as follows:

Q=RS, and $$S = \begin{bmatrix} 0 & T_3 & -T_2 \\ -T_3 & 0 & T_1 \\ T_2 & -T_1 & 0 \end{bmatrix} \qquad (5)$$

where R is a rotation matrix and S is a translation vector in a matrix representation. The relationship Q between the coordinate system of the camera 110 and that of the images are determined by multiplication of the rotation matrix R by the translation vector S.

The Equation (5) can be generalized as follows:

$$S_{\lambda \nu} = \epsilon_{\lambda \nu \sigma} T_\sigma \qquad (6)$$

Here, if the values of $(\lambda, \nu, \sigma)$ are not permutation of $(1, 2, 3)$, $S_{\lambda \nu}$ equals to zero.

Using the above equations, $X_1^T Q_{12} X_2$ can be obtained as follows:

$$X_1^T Q_{12} X_2 = [R_{1k}(X_k - T_k)]^T R_{1\lambda} \epsilon_{\lambda 2 \sigma} T_\sigma X_2 = (X_\lambda - T_\lambda)^T \epsilon_{\lambda 2 \sigma} T_\sigma X_2 \qquad (7)$$

Here, since $\epsilon_{\lambda \nu \sigma}$ has a anti-symmetric characteristic, the following equation can be obtained:

$$X_2^T Q_{12} X_1 = 0 \qquad (8)$$

The Equation (8) can be represented as follows:

$$\begin{bmatrix} X_2 \\ Y_2 \\ Z_2 \end{bmatrix}^T \begin{bmatrix} q_{11} & q_{12} & q_{13} \\ q_{21} & q_{22} & q_{23} \\ q_{31} & q_{32} & q_{33} \end{bmatrix} \begin{bmatrix} X_1 \\ Y_1 \\ Z_1 \end{bmatrix} = 0 \qquad (9)$$

The Equation (9) can be arranged as follows:

$$\begin{bmatrix} X_1 X_2 \\ Y_1 X_2 \\ Z_1 X_2 \\ X_1 Y_2 \\ Y_1 Y_2 \\ Z_1 Y_2 \\ X_1 Z_2 \\ Y_1 Z_2 \\ Z_1 Z_2 \end{bmatrix}^T \begin{bmatrix} q_{11} \\ q_{12} \\ q_{13} \\ q_{21} \\ q_{22} \\ q_{23} \\ q_{31} \\ q_{32} \\ q_{33} \end{bmatrix} = 0 \qquad (10)$$

If $q_{33}$ equals 1 in the Equation (10), and the equation (4) representing the relationship between the camera 110 and the images is applied to the Equation (10), then the Equation (10) can be expressed as follows:

$$\begin{bmatrix} u_1 u_2 \\ v_1 u_2 \\ f u_2 \\ u_1 v_2 \\ v_1 v_2 \\ f v_2 \\ f u_1 \\ f v_1 \end{bmatrix}^T \begin{bmatrix} q_{11} \\ q_{12} \\ q_{13} \\ q_{21} \\ q_{22} \\ q_{23} \\ q_{31} \\ q_{32} \end{bmatrix} = 0 \qquad (11)$$

An apparent from the Equation (11), information of at least eight corresponding points is required for obtaining the epipolar geometry information. However, in order to obtain eight corresponding points from an image plane and adequately select and use information thereof, lots of epipolar geometric restrictions should be satisfied. Further, in order to separately extract the components of the rotation matrix R and the translation vector S from the epipolar geometry information, lots of restrictions and assumptions are required. Therefore, according to the present invention, the epipolar geometry information, the rotation matrix R, and the translation vector S are computed using the components of the rotation matrix measured by the orientation measuring unit 130 rather than extracting the epipolar geometry information and the rotation matrix R using mathematical equations such as Equation (11).

Figure 3:
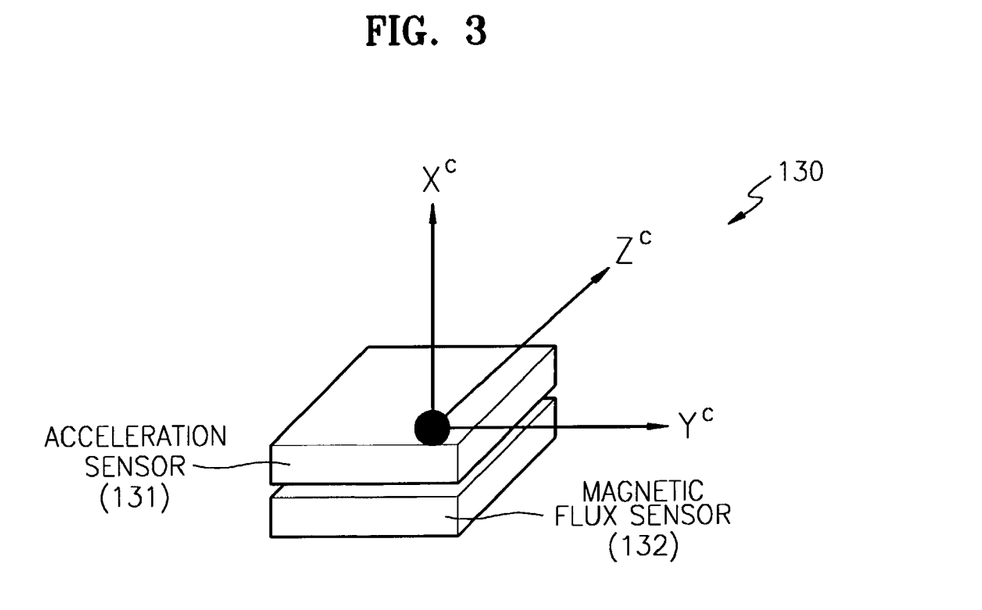
FIG. 3 illustrates an arrangement of the sensors included in the orientation measuring unit shown in FIG. 1, and the coordinates of the sensors.
Figure 4:
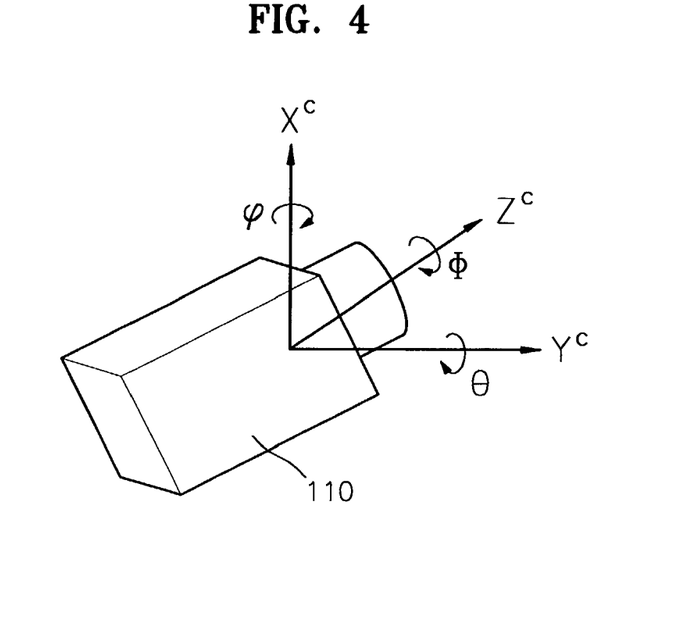
FIG. 4 illustrates the Euler's angles according to the coordinates of the camera shown in FIG. 1.
Figure 5:
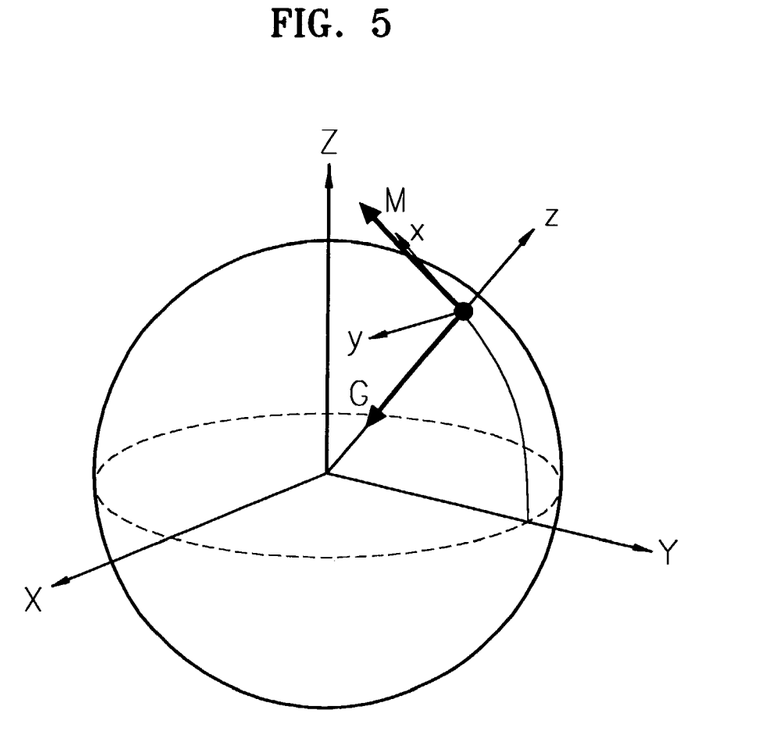
FIG. 5 illustrates the relationship between the fixed ground coordinates and the coordinates of the sensors shown in FIG. 1.

FIG. 3 illustrates an arrangement of the sensors included in the orientation measuring unit shown in FIG. 1, and the coordinates of the sensors. FIG. 4 illustrates the Euler's angles according to the coordinates of the camera shown in FIG. 1, and FIG. 5 illustrates the relationship between the fixed ground coordinates and the coordinates of the sensors shown in FIG. 1. A method for measuring the orientation of the autonomous vehicle 100 according to the present invention will be described with reference to FIGS. 3 to 5.

As described above with reference to FIG. 1, the orientation measuring unit 130 is comprised of an acceleration sensor 131 and a magnetic flux sensor 132. Referring to FIGS. 3 to 5, the acceleration sensor 131 detects and computes an angle φ about the z-axis, i.e., the angle between the x-y plane of the autonomous vehicle 100 and the x-y plane of the fixed ground coordinate system (the absolute coordinate system), in accordance with the following equation:

$$0 = r_{11} a_x + r_{12} a_y + r_{13} a_z$$

$$0 = r_{21} a_x + r_{22} a_y + r_{23} a_z$$

$$-G = r_{31} a_x + r_{32} a_y + r_{33} a_z \qquad (12)$$

In the above Equation (12), $r_{ij}$ is an element of the rotation matrix R, and the rotation matrix R can be represented as follows:

$$R = \begin{bmatrix} c\phi c\theta & c\phi s\theta s\varphi - s\phi c\varphi & c\phi s\theta c\varphi + s\phi s\varphi \\ s\phi s\theta & s\phi s\theta s\varphi + c\phi c\varphi & s\phi s\theta c\varphi - c\phi s\varphi \\ -s\theta & c\phi s\varphi & c\phi c\varphi \end{bmatrix} \qquad (13)$$

Likewise, the magnetic flux sensor 132 computes an angle φ about the x-axis, i.e., the angle between the y-z plane of the autonomous vehicle 100 and the y-z plane of the fixed ground coordinate system, in accordance with the following equation:

$$M = r_{11}m_x + r_{12}m_y + r_{13}m_z$$

$$0 = r_{21}m_x + r_{22}m_y + r_{23}m_z$$

$$0 = r_{31}m_x + r_{32}m_y + r_{33}m_z \quad (14)$$

In a case of measuring the rotation matrix R using Equation (14) and the Euler's angle as shown in FIG. 4, the epipolar geometry information can be simply represented as follows:

$$U_1^T Q_{12} U_2 = U_1^T R_{12} S U_2 = 0 \quad (15)$$

If it is assumed that the rotation matrix $R_{12}$ is known in the Equation (15), the following equation can be obtained:

$$U_1^T R_{12} S U_2 = \overline{U_1}^T S U_2 = 0 \quad (16)$$

From Equation (16), it is understood that $\overline{U_1}^T = U_1^T R_{12}$, and Equation (16) can arranged as follows:

$$\overline{U_1^T} S U_2 = \begin{bmatrix} \bar{u}_1 \\ \bar{v}_1 \\ \bar{f} \end{bmatrix} \begin{bmatrix} 0 & T_3 & -T_2 \\ -T_3 & 0 & T_1 \\ T_2 & -T_1 & 0 \end{bmatrix} \begin{bmatrix} u_2 \\ v_2 \\ f \end{bmatrix} = 0 \quad (17)$$

$$\overline{U_1^T} S U_2 = \begin{bmatrix} f\bar{v}_1 - \bar{f}v_2 \\ f\bar{u}_1 - \bar{f}u_2 \\ \bar{u}_1 v_2 - \bar{v}_1 u_2 \end{bmatrix} \begin{bmatrix} T_1 \\ T_2 \\ T_3 \end{bmatrix} = 0$$

If $T_3$ equals 1 in Equation (17), the following equation can be obtained:

$$\begin{bmatrix} f\bar{v}_1 - \bar{f}v_2 \\ f\bar{u}_1 - \bar{f}u_2 \end{bmatrix} \begin{bmatrix} T_1 \\ T_2 \end{bmatrix} = [\bar{u}_1 v_2 - \bar{v}_1 u_2] \quad (18)$$

As apparent from equation (18), according to the present invention, it is possible to correctly obtain the epipolar geometry information using at least two corresponding points. In comparison with this, it is noted that the conventional methods require at least eight corresponding points. That is, it is possible to more simply solve the epipolar geometry problems that have been hardly solved and subject to many restrictions.

Particularly, since at least two corresponding points are required according to the present invention, it is possible to obtain epipolar geometry information using more various and verified methods. Accordingly, the corresponding points can be more accurately measured, and therefore, it is possible to more simply and accurately analyze the motion of an autonomous vehicle and 3D information of an object in front of the autonomous vehicle.

Figure 6:
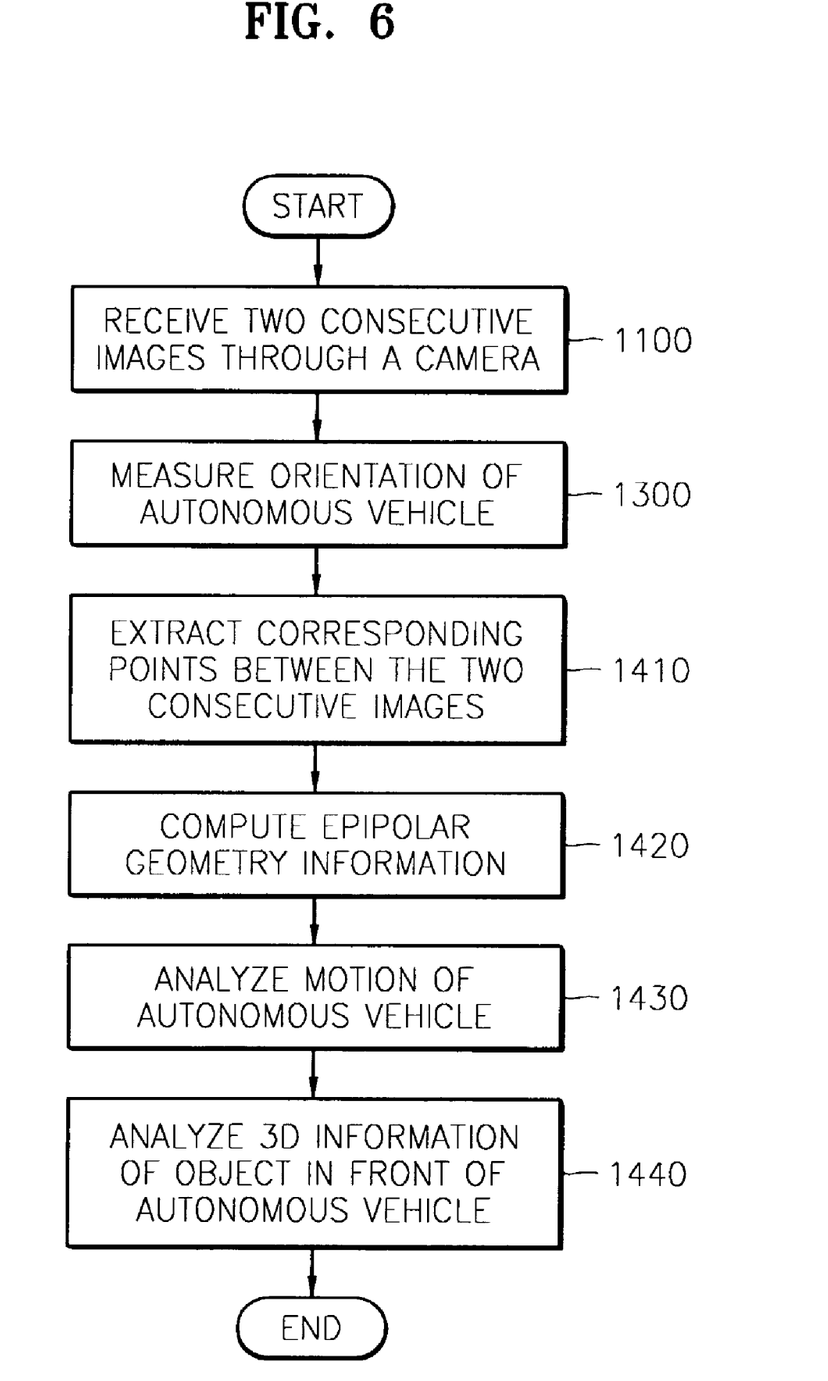
FIG. 6 is a flowchart of a method for estimating the motion of an autonomous vehicle and detecting three-dimensional information of an object in front of the autonomous vehicle according to a preferred embodiment of the present invention.

FIG. 6 is a flowchart of a method for estimating the motion of an autonomous vehicle and detecting three-dimensional information of an object in front of the autonomous vehicle according to a preferred embodiment of the present invention. First of all, two consecutive images are obtained through the camera 110 (STEP 1100). Unless the autonomous vehicle 100 stops moving, the two images are obtained at two different locations.

When the two consecutive images are obtained in STEP 1100, the orientation measuring unit 130 senses the directions of gravity and terrestrial magnetism using the acceleration sensor 131 and the magnetic flux sensor 132 respectively, and computes the orientation of the autonomous vehicle 100 with respect to the fixed ground coordinate system using the absolute values of the values sensed by the respective sensors (STEP 1300).

Thereafter, the corresponding point detection unit_141 included in the main control unit 140 extracts at least two corresponding points from the two consecutive images obtained in STEP 1100 (STEP 1410). Then, the epipolar computation unit 142 computes epipolar geometry information based on the rotation matrix R of the autonomous vehicle 100 provided from the orientation measuring unit 130 and the corresponding point information extracted by the corresponding point detection unit 141 (STEP 1420).

Figure 7:
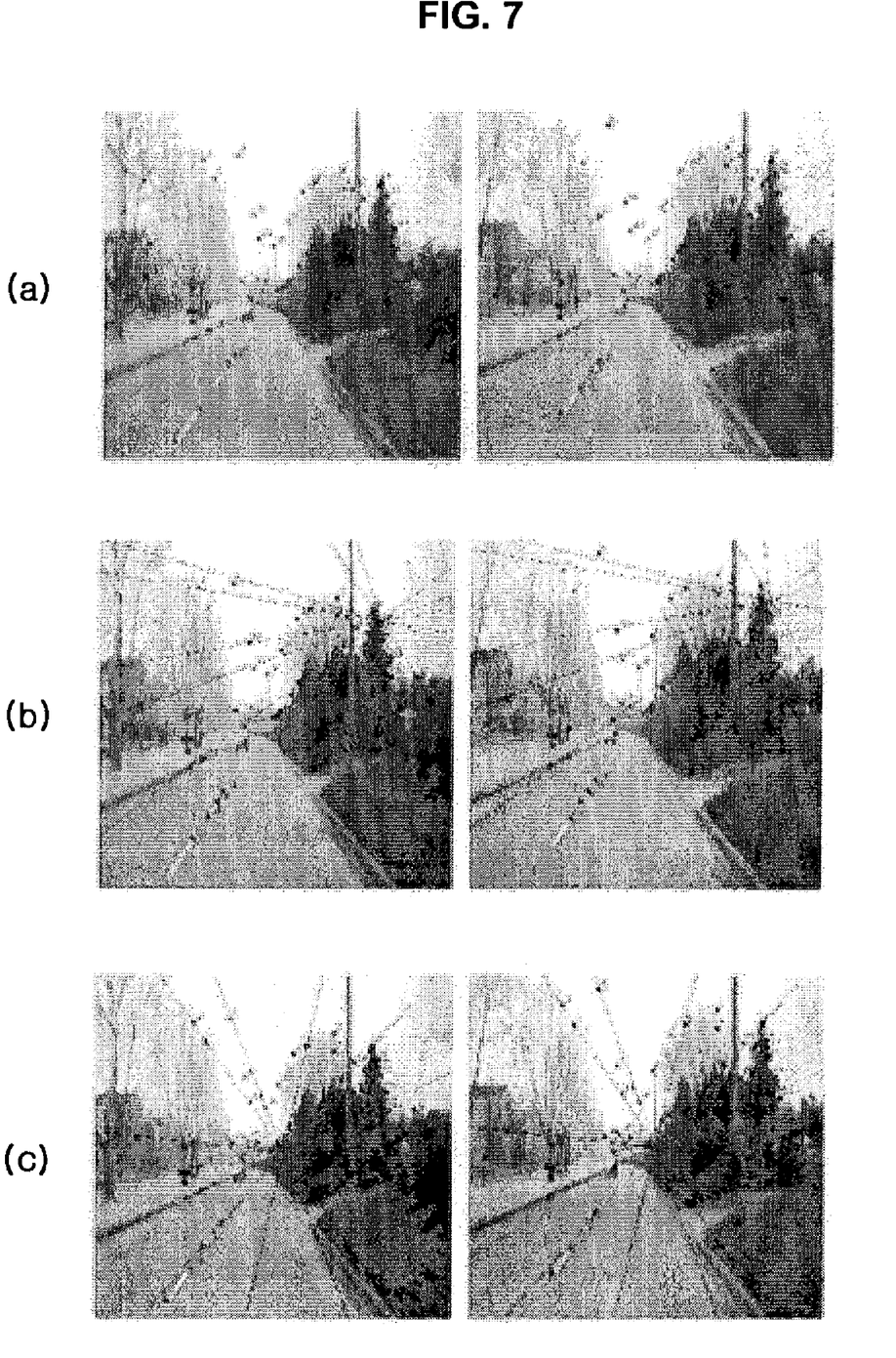

FIGS. 7a to 7c are photographic diagrams showing corresponding points and epipolar geometry information obtained by a system for detecting 3D information of an object existing in front of an autonomous vehicle according to the present invention. More specifically, FIG. 7a shows the results of extracting the corresponding points from two consecutive images, and FIG. 7b shows the results of extracting epipolar geometry information from the corresponding points shown in FIG. 7a. Further, the FIG. 7c shows the results of removing outliers from the images shown in FIG. 7b. As apparent from FIGS. 7a to 7c, according to the present invention, the epipolar geometry information can be accurately obtained using only two corresponding points without any negative effects due to various restrictions in computing epipolar geometry information. Therefore, it is possible to more accurately analyze the motion of an autonomous vehicle and 3D information of an object in front of the autonomous vehicle.

Referring again to FIG. 6, after the epipolar geometry information is computed in STEP 1420, the motion analysis unit 143 analyzes motion of the autonomous vehicle 100 based on the epipolar geometry information (STEP 1430), and the 3D information analysis unit 144 analyzes 3D information of an object in front of the autonomous vehicle 100 (STEP 1440).

As described above, according to the present invention, it is possible to correctly obtain the epipolar geometry information from only two corresponding points and more simply solve the epipolar geometry problems that are difficult to solve using conventional methods. Further, it is possible to more simply and accurately analyze the motion of an autonomous vehicle and 3D information of an object in front of the autonomous vehicle using information of only two corresponding points.

The present invention can be implemented as a computer readable code on a recording medium and executed on a computer. The recording medium may include any kind of recording devices on which data is stored. Examples of the recording medium include ROM, RAM, CD-ROM, magnetic tape, hard discs, floppy discs, flash memory, optical data storage devices, and even carrier wave, for example, transmission over the Internet. Moreover, the recording medium may be distributed among computer systems that are interconnected through a network, and the present invention may be stored and implemented as a compute code in the network.

While the present invention has been particularly shown and described with reference to preferred embodiments thereof, it will be understood by those of ordinary skill in the art that various changes in form and details may be made therein without departing from the spirit and scope of the present invention as defined by the appended claims.

What is claimed is:

1. An autonomous vehicle, comprising:
    a corresponding point detection unit for detecting corresponding points from at least two consecutive images obtained through a camera an orientation measuring unit for computing a rotation matrix based on orientation information of the autonomous vehicle;

an epipolar computation unit for computing epipolar geometry information based on the rotation matrix and translation information;

a motion analysis unit for analyzing motion of the autonomous vehicle based on the computed epipolar geometry information; and a three-dimensional (3D) information analysis unit for analyzing 3D information of the object existing in front of the autonomous vehicle based on the computed epipolar geometry information, wherein when a relationship between a coordinate system of the camera and a coordinate system of the images is represented by using the rotation matrix and the translation information, the translation information is determined by applying the rotation matrix and coordinates of at least two corresponding points to the relationship, where the orientation information represents orientation information between the two consecutive images, and the translation information represents translation information with respect to an earliest obtained image of the two consecutive images.

2. The autonomous vehicle according to claim 1, wherein the camera has the same coordinate axes as the autonomous vehicle.

3. The autonomous vehicle according to claim 1, wherein the images are obtained through a single camera at a predetermined frame rate.

4. The autonomous vehicle according to claim 1, wherein images are obtained simultaneously through a stereo camera or at least two or more cameras.

5. The autonomous vehicle according to claim 1, wherein the orientation measuring unit includes an acceleration sensor for measuring gravity and a magnetic flux sensor for measuring terrestrial magnetism, and wherein the orientation information of the autonomous vehicle is computed with respect to a fixed ground coordinate system using the absolute values of the values obtained through the acceleration sensor and the magnetic flux sensor.

6. The autonomous vehicle according to claim 1, wherein the epipolar computation unit computes the epipolar geometry information based on the orientation information computed by the orientation measuring unit and the information on at least two corresponding points.

7. The autonomous vehicle according to claim 6, wherein the epipolar S geometry information is computed in accordance with the following equations if a matrix expressing the orientation of the autonomous vehicle with respect to any two consecutive images can be measured:

$$\begin{bmatrix} f\overline{v}_1 - \overline{f}v_2 \\ f\overline{u}_1 - \overline{f}u_2 \end{bmatrix} \begin{bmatrix} T_1 \\ T_2 \end{bmatrix} = [\overline{u}_1 v_2 - \overline{v}_1 u_2$$

where f is the focal length of the camera, $T_1$ and $T_2$ are translation vector elements representing translation information between the two consecutive images, $u_1$ and $v_1$ are x and y coordinates on a plane of the image obtained earlier between the two consecutive images, and $u_2$ and $v_2$ are x and y coordinates on a plane of the image obtained later between the two consecutive images.

8. The autonomous vehicle according to claim 1, wherein the 3D information of the object in front of the autonomous vehicle includes information on a 3D shape of the object.

9. An apparatus for estimating the motion of an autonomous vehicle, comprising:

a corresponding point detection unit for detecting corresponding points from at least two consecutive images obtained through a camera;

an orientation measuring unit for computing orientation information of the autonomous vehicle;

an epipolar computation unit for computing epipolar geometry information based on the rotation matrix and translation information; and a motion analysis unit for analyzing the motion of the autonomous vehicle based on the computed epipolar geometry information, wherein when a relationship between a coordinate system of the camera and a coordinate system of the images is represented by using the rotation matrix and the translation information, the translation information is determined by applying the rotation matrix and coordinates of at least two corresponding points to the relationship, where the orientation information represents orientation information between the two consecutive images, and the translation information represents translation information with respect to an earliest obtained image of the two consecutive images.

10. The apparatus for estimating the motion of an autonomous vehicle according to claim 9, wherein the camera has the same coordinate axes with the autonomous vehicle.

11. The apparatus for estimating the motion of an autonomous vehicle according to claim 9, wherein the images are obtained through a single camera at a predetermined frame rate.

12. The apparatus for estimating the motion of an autonomous vehicle according to claim 9, wherein images are obtained simultaneously through a stereo camera or at least two or more cameras.

13. The apparatus for estimating the motion of an autonomous vehicle according to claim 9, wherein the orientation measuring unit includes an acceleration sensor for measuring gravity and a magnetic flux sensor for measuring terrestrial magnetism, and wherein the orientation information of the autonomous vehicle is computed with respect to a fixed ground coordinate system using the absolute values of the values obtained through the acceleration sensor and the magnetic flux sensor.

14. The apparatus for estimating the motion of an autonomous vehicle according to claim 9, wherein the epipolar computation unit computes the epipolar geometry information based on the orientation information computed by the orientation measuring unit and information on at least two corresponding points.

15. The apparatus for estimating the motion of an autonomous vehicle according to claim 14, wherein the epipolar geometry information is computed in accordance with the following equations if a matrix expressing the orientation of the autonomous vehicle with respect to any two consecutive images can be measured:

$$\begin{bmatrix} f\overline{v}_1 - \overline{f}v_2 \\ f\overline{u}_1 - \overline{f}u_2 \end{bmatrix} \begin{bmatrix} T_1 \\ T_2 \end{bmatrix} = [\overline{u}_1 v_2 - \overline{v}_1 u_2$$

where f is the focal length of the camera, $T_1$ and $T_2$ are translation vector elements representing translation information between the two consecutive images, $u_1$ and $v_1$ are x and y coordinates on a plane of the image obtained earlier between the two consecutive images, and $u_2$ and $v_2$ are x and y coordinates on a plane of the image obtained later between the two consecutive images.

16. An apparatus for detecting three-dimensional (3D) information of an object existing in front of an autonomous vehicle, comprising:

a corresponding point detection unit for detecting corresponding points from at least two consecutive images obtained through a camera;

an orientation measuring unit for computing a rotation matrix based on orientation information of the autonomous vehicle;

an epipolar computation unit for computing epipolar geometry information based on the rotation matrix and translation information; and a 3D information analysis unit for analyzing 3D information of the object existing in front of the autonomous vehicle based on the computed epipolar geometry information, wherein when a relationship between a coordinate system of the camera and a coordinate system of the images is represented by using the rotation matrix and the translation information, the translation information is determined by applying the rotation matrix and coordinates of at least two corresponding points to the relationship, where the orientation information represents orientation information between the two consecutive images, and the translation information represents translation information with respect to an earliest obtained image of the two consecutive images.

17. The apparatus for detecting three-dimensional (3D) information of an object existing in front of an autonomous vehicle according to claim 16, wherein the camera has the same coordinate axes with the autonomous vehicle.

18. The apparatus for detecting three-dimensional (3D) information of an object existing in front of an autonomous vehicle according to claim 16, wherein the images are obtained through a single camera at a predetermined frame rate.

19. The apparatus for detecting three-dimensional (3D) information of an object existing in front of an autonomous vehicle according to claim 16, wherein images are obtained simultaneously through a stereo camera or at least two or more cameras.

20. The apparatus for detecting three-dimensional (3D) information of an object existing in front of an autonomous vehicle according to claim 16, wherein the orientation measuring unit includes an acceleration sensor for measuring gravity and a magnetic flux sensor for measuring terrestrial magnetism, and wherein the orientation information of the autonomous vehicle is computed with respect to a fixed ground coordinate system using the absolute values of the values obtained through the acceleration sensor and the magnetic flux sensor.

21. The apparatus for detecting three-dimensional (3D) information of an object existing in front of an autonomous vehicle according to claim 16, wherein the epipolar computation unit computes the epipolar geometry information based on the orientation information computed by the orientation measuring unit and the information on at least two corresponding points.

22. The apparatus for detecting three-dimensional (3D) information of an object existing in front of an autonomous vehicle according to claim 21, wherein the epipolar geometry information is computed in accordance with the following equations if a matrix expressing the orientation of the autonomous vehicle with respect to any two consecutive images can be measured:

$$\begin{bmatrix} f\overline{v_1} - \overline{f}v_2 \\ f\overline{u_1} - \overline{f}u_2 \end{bmatrix} \begin{bmatrix} T_1 \\ T_2 \end{bmatrix} = [\overline{u_1}v_2 - \overline{v_1}u_2]$$

where f is the focal length of the camera, $T_1$ and $T_2$ are translation vector elements representing translation information between the two consecutive images, $u_1$ and $v_1$ are x and y coordinates on a plane of the image obtained earlier between the two consecutive images, and $u_2$ and $v_2$ are x and y coordinates on a plane of the image obtained later between the two consecutive images.

23. The apparatus for detecting three-dimensional (3D) information of an object existing in front of an autonomous vehicle according to claim 16, wherein the 3D information of the object in front of the autonomous vehicle includes information on a distance between the autonomous vehicle and the object, and information on a 3D shape of the object.

24. A method for controlling the motion of an autonomous vehicle comprising the steps of:

(a) detecting corresponding points from at least two consecutive images obtained through a camera;

(b) computing a rotation matrix based on orientation information of the autonomous vehicle;

(c) computing epipolar geometry information based on the rotation matrix and translation information;

(d) analyzing the motion of the autonomous vehicle based on the computed epipolar geometry information; and (e) analyzing three-dimensional information of an object existing in front of the autonomous vehicle based on the computed epipolar geometry information, wherein when a relationship between a coordinate system of the camera and a coordinate system of the images is represented by using the rotation matrix and the translation information, the translation information is determined by applying the rotation matrix and coordinates of at least two corresponding points to the relationship, where the orientation information represents orientation information between the two consecutive images, and the translation information represents translation information with respect to an earliest obtained image of the two consecutive images.

25. The method for controlling the motion of an autonomous vehicle according to claim 24, wherein the camera has the same coordinate axes with the autonomous vehicle.

26. The method for controlling the motion of an autonomous vehicle according to claim 24, wherein the images are obtained through a single camera at a predetermined frame rate.

27. The method for controlling the motion of an autonomous vehicle according to claim 24, wherein images are obtained simultaneously through a stereo camera or at least two or more cameras.

28. The method for controlling the motion of an autonomous vehicle according to claim 24, wherein step (b) includes:

(b-i) measuring gravity;

(b-2) measuring terrestrial magnetism; and (b-3) computing the orientation information of the autonomous vehicle with respect to a fixed ground coordinate system using the absolute values of the values obtained in steps (b-1) and (b-2).

29. The method for controlling the motion of an autonomous vehicle according to claim 24, wherein step (c) includes computing the epipolar geometry information based on the orientation information computed in step (b) and the information on at least two corresponding points.

30. The method for controlling the motion of an autonomous vehicle according to claim 29, wherein the epipolar geometry information is computed in accordance with the following equations if a matrix expressing the orientation of the autonomous vehicle with respect to any two consecutive images can be measured:

$$\begin{bmatrix} f\overline{v_1} - \overline{f}v_2 \\ f\overline{u_1} - \overline{f}u_2 \end{bmatrix} \begin{bmatrix} T_1 \\ T_2 \end{bmatrix} = [\overline{u_1}v_2 - \overline{v_1}u_2]$$

where f is the focal length of the camera, $T_1$ and $T_2$ are translation vector elements representing translation information between the two consecutive images, $u_1$ and $v_1$ are x and y coordinates on a plane of the image obtained earlier between the two consecutive images, and $u_2$ and $v_2$ are x and y coordinates on a plane of the image obtained later between the two consecutive images.

31. The method for controlling the motion of an autonomous vehicle according to claim 24, wherein the 3D information of the object in front of the autonomous vehicle includes information on a distance between the autonomous vehicle and the object, and information on a 3D shape of the object.

32. A method for estimating the motion of an autonomous vehicle, comprising the steps of:
(a) detecting corresponding points from at least two consecutive images obtained through a camera;
(b) computing a rotation matrix based on orientation information of the autonomous vehicle;
(c) computing epipolar geometry information based on the rotation matrix and translation information; and
(d) analyzing motion of the autonomous vehicle based on the computed epipolar geometry information,
wherein when a relationship between a coordinate system of the camera and a coordinate system of the images is represented by using the rotation matrix and the translation information, the translation information is determined by applying the rotation matrix and coordinates of at least two corresponding points to the relationship, where the orientation information represents orientation information between the two consecutive images, and the translation information represents translation information with respect to an earliest obtained image of the two consecutive images.

33. The method for estimating the motion of an autonomous vehicle according to claim 32, wherein the camera has the same coordinate axes with the autonomous vehicle.

34. The method for estimating the motion of an autonomous vehicle according to claim 32, wherein the images are obtained through a single camera at a predetermined frame rate.

35. The method for estimating the motion of an autonomous vehicle according to claim 32, wherein images are obtained simultaneously through a stereo camera or at least two or more cameras.

36. The method for estimating the motion of an autonomous vehicle according to claim 32, wherein step (b) includes:
(b-1) measuring gravity;
(b-2) measuring terrestrial magnetism; and
(b-3) computing the orientation information of the autonomous vehicle with respect to a fixed ground coordinate system using the absolute values of the values obtained in steps (b-1) and (b-2).

37. The method for estimating the motion of an autonomous vehicle according to claim 32, wherein step (c) includes computing the epipolar geometry information based on the orientation information computed in step (b) and the information on at least two corresponding points.

38. The method for estimating the motion of an autonomous vehicle according to claim 37, wherein the epipolar geometry information is computed in accordance with the following equations if a matrix expressing the orientation of the autonomous vehicle with respect to any two consecutive images can be measured:

$$\begin{bmatrix} f\overline{v_1} - \overline{f}v_2 \\ f\overline{u_1} - \overline{f}u_2 \end{bmatrix} \begin{bmatrix} T_1 \\ T_2 \end{bmatrix} = [\overline{u_1}v_2 - \overline{v_1}u_2]$$

where f is the focal length of the camera, $T_1$ and $T_2$ are translation vector elements representing translation information between the two consecutive images, $u_1$ and $v_1$ are x and y coordinates on a plane of the image obtained earlier between the two consecutive images, and $u_2$ and $v_2$ are x and y coordinates on a plane of the image obtained later between the two consecutive images.

39. A method for detecting three-dimensional (3D) information of an object existing in front of an autonomous vehicle, comprising the steps of:
(a) detecting corresponding points from at least two consecutive images obtained through a camera;
(b) computing a rotation matrix based on orientation information of the autonomous vehicle;
(c) computing epipolar geometry information based on the rotation matrix and translation information; and
(d) analyzing 3D information of the object existing in front of the autonomous vehicle based on the computed epipolar geometry information,
wherein when a relationship between a coordinate system of the camera and a coordinate system of the images is represented by using the rotation matrix and the translation information, the translation information is determined by applying the rotation matrix and coordinates of at least two corresponding points to the relationship, where the orientation information represents orientation information between the two consecutive images, and the translation information represents translation information with respect to an earliest obtained image of the two consecutive images.

40. The method for detecting three-dimensional (3D) information of an object existing in front of an autonomous vehicle according to claim 39, wherein the camera has the same coordinate axes with the autonomous vehicle.

41. The method for detecting three-dimensional (3D) information of an object existing in front of an autonomous vehicle according to claim 39, wherein the images are obtained through a single camera at a predetermined frame rate.

42. The method for detecting three-dimensional (3D) information of an object existing in front of an autonomous vehicle according to claim 39, wherein images are obtained simultaneously through a stereo camera or at least two or more cameras.

43. The method for detecting three-dimensional (3D) information of an object existing in front of an autonomous vehicle according to claim 41 wherein step (b) includes:
(b-1) measuring gravity;
(b-2) measuring terrestrial magnetism; and
(b-3) computing the orientation information of the autonomous vehicle with respect to a fixed ground coordinate system using absolute values of the values obtained in steps (b-1) and (b-2).

44. The method for detecting three-dimensional (3D) information of an object existing in front of an autonomous vehicle according to claim 39, wherein step (c) includes computing the epipolar geometry information based on the orientation information computed in step (b) and the information on at least two corresponding points.

45. The method for detecting three-dimensional (3D) information of an object existing in front of an autonomous vehicle according to claim 44, wherein the epipolar geometry information is computed in accordance with the following equations if a matrix expressing the orientation of the autonomous vehicle with respect to any two consecutive images can be measured:

$$\begin{bmatrix} f\overline{v_1} - \overline{f}v_2 \\ f\overline{u_1} - \overline{f}u_2 \end{bmatrix} \begin{bmatrix} T_1 \\ T_2 \end{bmatrix} = [\overline{u_1}v_2 - \overline{v_1}u_2]$$

where f is the focal length of the camera, $T_1$ and $T_2$ are translation vector elements representing translation information between the two consecutive images, $u_1$ and $v_1$ are x and y coordinates on a plane of the image obtained earlier between the two consecutive images, and $u_2$ and $v_2$ are x and y coordinates on a plane of the image obtained later between the two consecutive images.

46. The method for detecting three-dimensional (3D) information of an object existing in front of an autonomous vehicle according to claim 39, wherein the 3D information of the object in front of the autonomous vehicle includes-information on a distance between the autonomous vehicle and the object, and information on a 3D shape of the object.

47. A computer readable recording medium that stores a computer program to implement a method according to claim 24.

48. A computer readable recording medium that stores a computer program to implement a method according to claim 32.

49. A computer readable recording medium that stores a computer program to implement a method according to claim 39.

* * * * *